United States Patent
Leopold et al.

(10) Patent No.: US 10,723,109 B2
(45) Date of Patent: Jul. 28, 2020

(54) METHOD FOR PRODUCING A POLYCARBONATE LAYERED COMPOSITE

(71) Applicants: Bundesdruckerei GmbH, Berlin (DE); COVESTRO DEUTSCHLAND AG, Leverkusen (DE)

(72) Inventors: Andre Leopold, Berlin (DE); Oliver Muth, Berlin (DE); Michael Knebel, Berlin (DE); Rainer Seidel, Berlin (DE); Jens Ehreke, Berlin (DE); Manfred Paeschke, Basdorf (DE); Heinz Pudleiner, Krefeld (DE); Cengiz Yesildag, Leverkusen (DE); Klaus Meyer, Dormagen (DE)

(73) Assignees: COVESTRO DEUTSCHLAND AG, Leverkusen (DE); Bundesdruckerei GmbH, Berlin (DE)

( * ) Notice: Subject to any disclaimer, the term of this patent is extended or adjusted under 35 U.S.C. 154(b) by 328 days.

(21) Appl. No.: 15/610,768

(22) Filed: Jun. 1, 2017

(65) Prior Publication Data
US 2017/0266936 A1   Sep. 21, 2017

Related U.S. Application Data

(63) Continuation of application No. 12/740,787, filed as application No. PCT/DE2008/001750 on Oct. 29, 2008, now abandoned.

(30) Foreign Application Priority Data

Oct. 31, 2007   (DE) .................. 10 2007 052 949

(51) Int. Cl.
*B32B 27/36* (2006.01)
*B32B 7/05* (2019.01)
*B32B 27/08* (2006.01)

(52) U.S. Cl.
CPC .............. *B32B 27/365* (2013.01); *B32B 7/05* (2019.01); *B32B 27/08* (2013.01);
(Continued)

(58) Field of Classification Search
CPC .................................................... B32B 27/365
See application file for complete search history.

(56) References Cited

U.S. PATENT DOCUMENTS 2,970,131 A   1/1961   Moyer et al.
2,991,273 A   7/1961   Hechelhammer et al.
(Continued)

FOREIGN PATENT DOCUMENTS

DE   1570703   2/1970
DE   2063050   7/1972
(Continued)

OTHER PUBLICATIONS

"Chemistry and Physics of Polycarbonates", Hermann Schnell, Interscience Publishers, 1964, pp. 27-98.

*Primary Examiner* — Daniel H Lee
(74) *Attorney, Agent, or Firm* — Stuart H. Mayer; Mayer & Williams PC

(57) ABSTRACT

The invention relates to a method for making a structure with at least a first polymer layer and a second polymer layer, each made from a polycarbonate polymer based on bisphenol A, and in between the first polymer layer and the second polymer layer an intermediate layer being arranged, comprising the following steps: a) the intermediate layer is applied at least on a partial region of the first polymer layer, b) optionally the intermediate layer is dried, c) the first polymer layer is coated on the side, on which the intermediate layer is arranged, with a liquid preparation comprising a solvent or a mixture of solvents and a polycarbonate derivative based on a geminally disubstituted dihydroxydi- (Continued)

phenyl cycloalkane, the preparation covering the intermediate layer, d) optionally a drying step is made after step c), e) after step c) or step d), the second polymer layer is placed on the first polymer layer, covering the intermediate layer, f) the first polymer layer and the second polymer layer are laminated with each other under pressure, at a temperature from 120° C. to 230° C. and for a defined time.

16 Claims, 2 Drawing Sheets

(52) U.S. Cl.
CPC ....... *B32B 2307/75* (2013.01); *B32B 2425/00* (2013.01); *B32B 2554/00* (2013.01); *Y10T 428/31507* (2015.04)

(56) References Cited

U.S. PATENT DOCUMENTS

| | | | |
|---|---|---|---|
| 2,999,835 A | 9/1961 | Goldberg et al. | |
| 2,999,846 A | 9/1961 | Schnell et al. | |
| 3,028,365 A | 4/1962 | Schnell et al. | |
| 3,062,781 A | 11/1962 | Bottenbruch et al. | |
| 3,148,172 A | 9/1964 | Fox et al. | |
| 3,271,367 A | 9/1966 | Schnell et al. | |
| 3,275,601 A | 9/1966 | Schnell et al. | |
| 5,733,651 A * | 3/1998 | Wank | C09D 167/03 428/339 |
| 6,817,630 B1 * | 11/2004 | Fischer | B42D 25/00 283/107 |
| 2003/0127847 A1 | 7/2003 | Keller et al. | |
| 2004/0191521 A1 | 9/2004 | Weiss et al. | |
| 2005/0247794 A1 | 11/2005 | Jones | |

FOREIGN PATENT DOCUMENTS

| | | |
|---|---|---|
| DE | 2063052 | 7/1972 |
| DE | 2211956 | 10/1973 |
| DE | 3832396 A1 | 2/1990 |
| DE | 297605 | 1/1992 |
| DE | 4421561 | 12/1995 |
| DE | 4424106 | 1/1996 |
| DE | 10013410 | 9/2001 |
| DE | 10159373 | 6/2003 |
| DE | 102007018450 A1 | 10/2008 |
| EP | 0688839 A2 | 12/1995 |
| FR | 1561518 | 3/1969 |

* cited by examiner

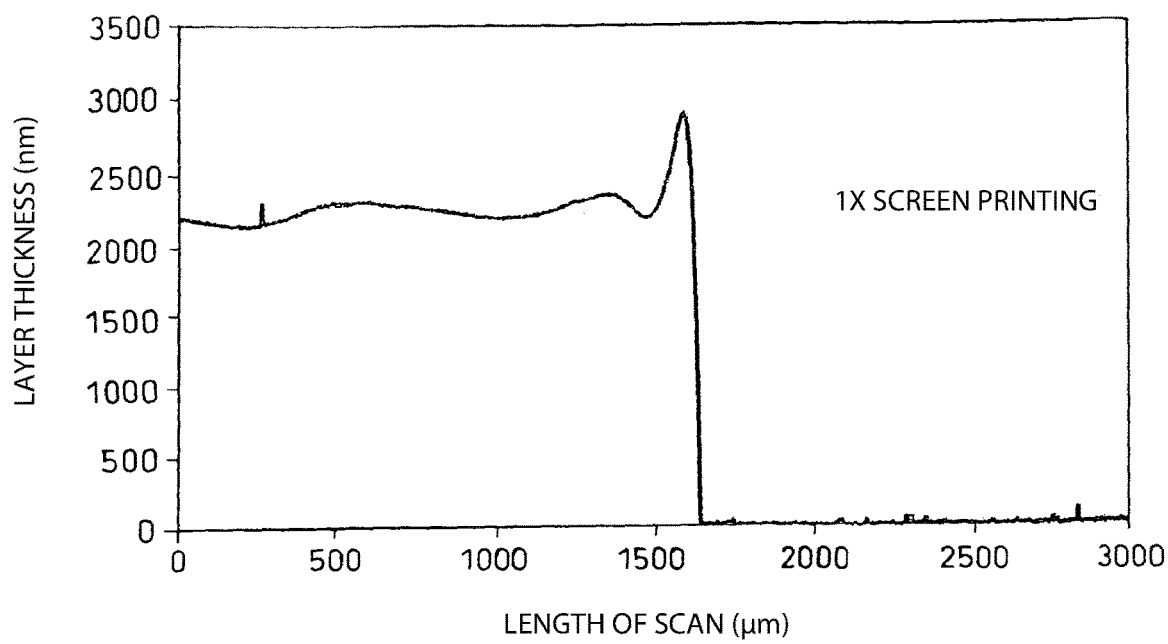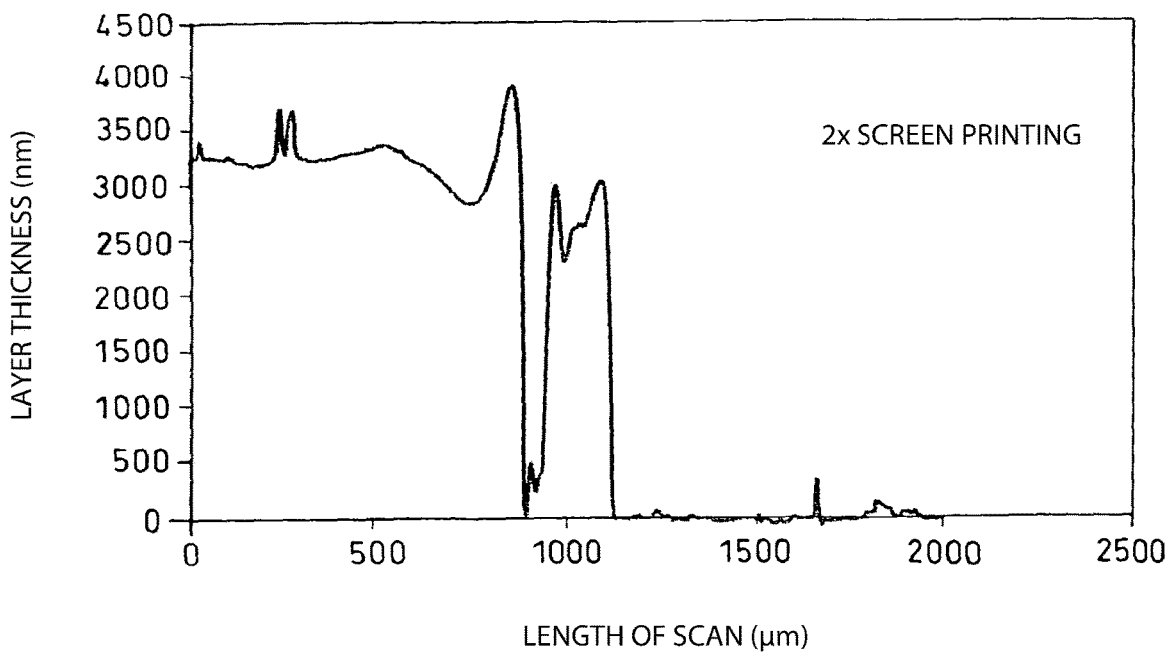

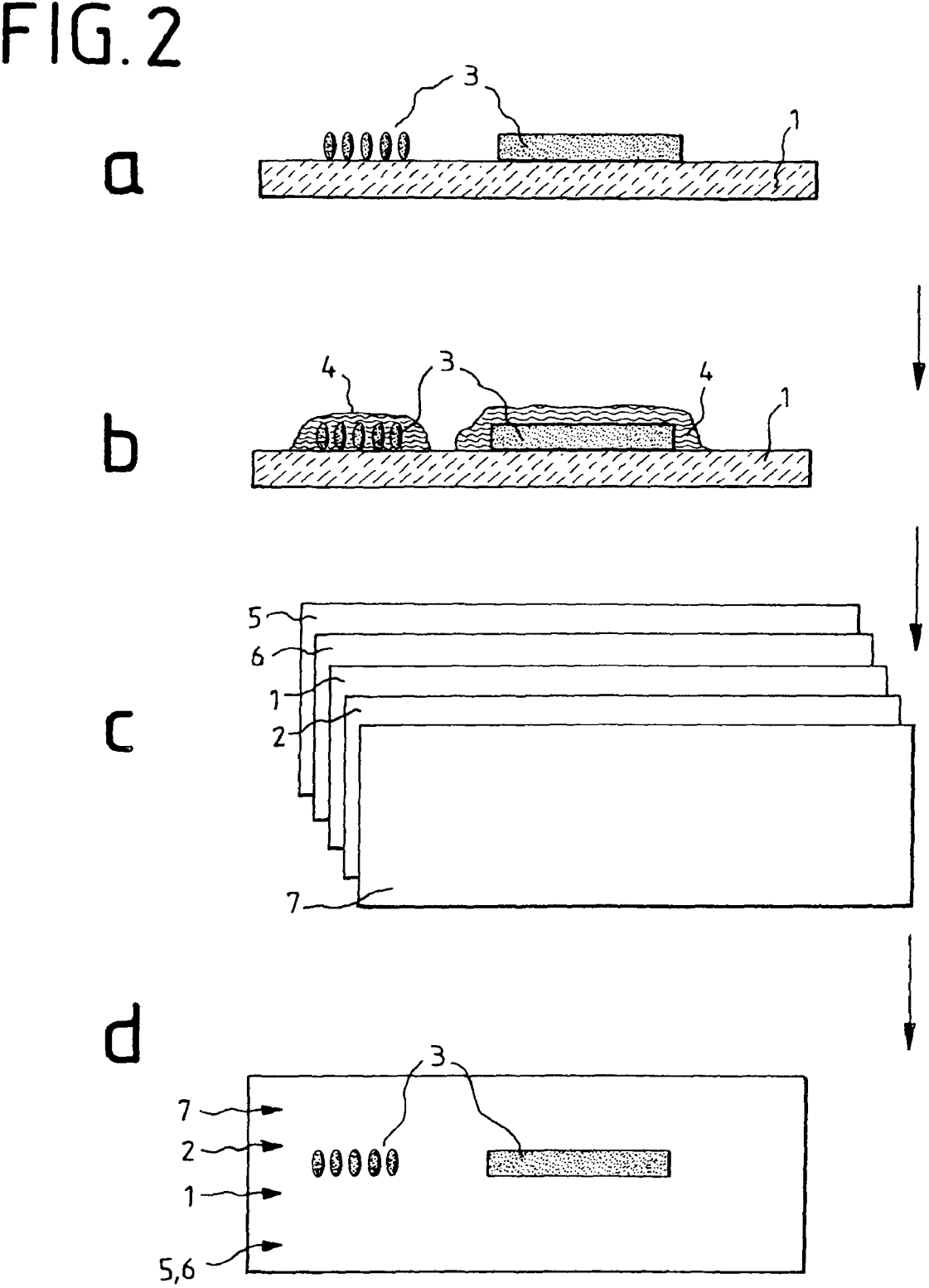

METHOD FOR PRODUCING A POLYCARBONATE LAYERED COMPOSITE

FIELD OF THE INVENTION

The invention relates to a method for making a structure with at least one first polymer layer and a second polymer layer each made from a polycarbonate polymer based on bisphenol A, between the polymer layers an intermediate layer being arranged, comprising the following steps: the intermediate layer is applied at least on a partial region of the first polymer layer, then the second polymer layer is placed on the first polymer layer or the intermediate layer, and the first polymer layer and the second polymer layer are laminated with each other under pressure, at an increased temperature and for a defined time. The invention further relates to a structure obtainable in this way, to the use of the method for making a security and/or value document, and to a security and/or value document to be thus made.

BACKGROUND OF THE INVENTION AND PRIOR ART

Plastic cards are typically made by lamination of films, which are adapted as polymer layers. For this purpose, a close connection between the polymer layers is produced under pressure at a temperature, which is above the softening point (glass point) of the polymer layers, by that the polymer chains being movable above the glass point mix with each other, and in an ideal case an inseparable, monolithic structure is obtained from the polymer layers.

These polymer layers may in part be provided with additional features, e.g. pigmentations for optimizing the densities are included in laser engraving.

Between the polymer layers, additional elements are normally provided, in particular an intermediate layer, for instance a printing layer in the form of security printing elements, such as guilloches, microprint and so on or special inks such as optical variable ink (OVI) and the like may be provided on one of the polymer layers and in the completed structure between the polymer layers. An intermediate layer may however also be for instance a film with diffractive elements as a security feature. In particular it is also possible, to integrate a photographically produced image as an intermediate layer between the polymer layers. A method with regard thereto is described in the document DE 10 2007 018 450.8. Such an intermediate layer may cover or underlie a part only of the underlying and/or overlying polymer layer, may however also be stacked therewith in a coincident manner.

It is common to all these examples that the intermediate layer may disturb the above process of the lamination, in particular if the intermediate layer is incompatible with the polymer layers to be combined. This incompatibility may consist in that the intermediate layer obstructs as a separating layer the process of the mixture of the softened polymer layers.

For instance, it has been found that printing layers will normally excellently adhere to the actual printing substrate, the first polymer layer, in the completed structure, the adhesion to the second polymer layer applied during the lamination on the printing layer is worse compared thereto, and consequently a delamination may occur between the intermediate layer and the second polymer layer. The weak point is thus the boundary layer between the printing layer and the applied and laminated second polymer layer. This may be particularly critical for full-surface printing on the first polymer layer.

From the document EP 0 688 839 A2, polycarbonates based on a geminally disubstituted dihydroxydiphenyl cycloalkane are per se known. In this prior art, such polycarbonates are used as binding agents of silk-screen printing inks. From this document can also be taken methods for making such polycarbonates. This document with its complete contents is hereby included in the scope of disclosure of the present application.

TECHNICAL OBJECT OF THE INVENTION

It is therefore the technical object of the invention to provide a method for laminating an intermediate layer being not compatible or only to a reduced degree with polycarbonate polymer layers between such polycarbonate polymer layers, which results in a structure, which secures a better protection against delamination and consequently a very high integrity and durability of the produced structure.

BASICS OF THE INVENTION AND PREFERRED EMBODIMENTS

For achieving this technical object, the invention teaches a method for making a structure with at least one first polymer layer and a second polymer layer, each made from a polycarbonate polymer based on bisphenol A, between the first polymer layer and the second polymer layer an intermediate layer being arranged, comprising the following steps: a) the intermediate layer is applied at least on a partial region of the first polymer layer, b) optionally the intermediate layer is dried, c) the first polymer layer is coated on the side, on which the intermediate layer is arranged, at least partially with a liquid preparation comprising a solvent or a mixture of solvents and a polycarbonate derivative based on a geminally disubstituted dihydroxydiphenyl cycloalkane, the preparation covering the intermediate layer, preferably completely, d) optionally a drying step is made after step c), e) after step c) or step d), the second polymer layer is placed on the first polymer layer, covering the intermediate layer, f) the first polymer layer and the second polymer layer are laminated with each other under pressure, at a temperature from 120° C. to 230° C. and for a defined time.

The invention is based on the finding that polycarbonate derivatives used according to the invention are highly compatible with polycarbonate materials for films, in particular with polycarbonates based on bisphenol A, such as for instance Makrofol® films. The high compatibility is shown when the layer provided according to the invention and a polycarbonate derivative combines with the polycarbonate materials of the films to form a monolithic structure. A layer boundary between the materials cannot optically be detected anymore after the lamination.

It was found, however, that by interposition of a layer with a polycarbonate derivative used according to the invention between the intermediate layer (already applied on the first polymer layer and well adhering thereto) and the second polymer layer, also a good adhesion of the intermediate layer to the second polymer film is achieved, and that in particular also for materials of the intermediate layer, which are not polymers based on bisphenol A or of the polycarbonate derivate.

Overall, a structure being substantially improved with regard to integrity and durability is obtained.

Another aspect of the invention is that the liquid preparations used according to the invention, in particular solutions, can be applied by printing techniques and can therefore be employed for the conventional printing methods (e.g. screen, gravure, letterpress and flat printing, but also ink jet printing) with the respective low layer thicknesses. Commercially available adhesion systems (e.g. based on epoxides) can theoretically also be printed, would however change color during lamination or lose their adhesive properties.

In principle, intermediate layers of arbitrary materials and arbitrary kind can be used for the invention. The intermediate layer may for instance be a printing layer, in particular comprising a security printing element and/or a printed photographic representation, a photographic emulsion, and/or a film, in particular a diffractive security film. All intermediate layers known to the man skilled in the art of security and/or value documents can be used. In this context, it has to be noted that the term of the intermediate layer of course also comprises a plurality of adjacent small elements, such as for instance the matrix dots of a printing layer.

The intermediate layer can be provided over the full surface on the first polymer layer. It is however also possible that the intermediate layer is provided in a partial region only of the surface of the first polymer layer.

Equally, the preparation can be applied over the full surface of the first polymer layer provided with the intermediate layer, or only partially, it is however essential that the intermediate layer is completely covered.

The pressure in step f) typically is in the range from 1 bar to 10 bars, in particular in the range from 3 bars to 7 bars. The temperature in step f) preferably is in the range from 140° C. to 200° C., in particular in the range from 150° C. to 180° C. The time of step e) may be in the range from 0.5 s to 120 s, in particular from 5 s to 60 s, is however not relevant for the invention.

In step d), drying may be performed at a temperature in the range from 20° C. to 120° C., in particular from 60° C. to 120° C., preferably from 80° C. to 110° C., for a time of at least 1 min, preferably from 5 min to 600 min, in particular from 10 min to 120 min. In the event that the intermediate layer is for instance a printing layer, corresponding temperatures and/or times can be used for the optional step b), and the temperature may however also be below 60° C., for instance 20° C. to 60° C., and the time may alternatively also be below 1 min, for instance 1 s to 60 s.

The layer thickness generated in step c) (before or after drying) is for instance in the range from 0.1 μm to 30 μm, preferably from 1 μm to 10 μm, in particular from 2 μm to 5 μm.

The used polymer layers may have thicknesses in the range from 20 μm to 1,000 μm, in particular from 50 μm to 300 μm. The intermediate layer may have a thickness from 0.1 μm to 1,000 μm, in particular from 1 μm to 50 μm. In particular printing layers will typically have layer thicknesses in the range from 1 μm to 30 μm. In contrast thereto, photographic emulsions and/or other films, such as diffractive security films, will rather have layer thicknesses in the range from 5 μm to 1,000 μm, in particular from 10 μm to 100 μm.

It is preferred, that the polycarbonate derivative has an average molecular weight (mean weight) of at least 10,000, preferably from 20,000 to 300,000.

In detail, the polycarbonate derivative may contain functional carbonate structure units of formula (I),

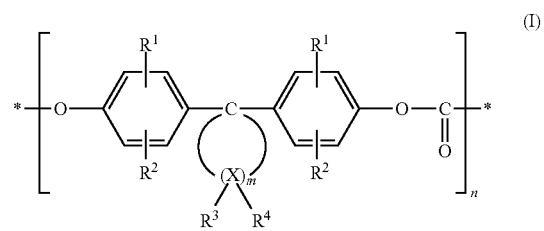

wherein $R^1$ and $R^2$ are independently from each other hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$ alkyl, in particular benzyl; m is an integer from 4 to 7, preferably 4 or 5; $R^3$ and $R^4$ can be individually selected for each X, and independently represent hydrogen or $C_1$-$C_6$ alkyl; X is carbon and n an integer greater than 20, with the proviso that at at least one atom X, $R^3$ and $R^4$ are both alkyl.

Further, it is preferred, if at 1 to 2 atoms X, in particular at one atom X only, $R^3$ and $R^4$ both are alkyl. $R^3$ and $R^4$ may in particular be methyl. The X atoms in the alpha position to the diphenyl-substituted C atom (C1) cannot be dialkyl-substituted. The X atoms in the beta position to C1 can be disubstituted with alkyl. Preferred is m=4 or 5. The polycarbonate derivative may for instance be formed based on monomers, such as 4,4'-(3,3,5-trimethyl cyclohexane-1,1-diyl)diphenol, 4,4'-(3,3-dimethyl cyclohexane-1,1-diyl)diphenol, or 4,4'-(2,4,4-trim ethyl cyclopentane-1,1-diyl)diphenol.

A polycarbonate derivative used according to the invention may for instance be made from diphenols of formula (Ia) according to the document DE 38 32 396.6, the scope of disclosure of which with its complete contents is hereby included in the scope of disclosure of this description.

A diphenol of formula (Ia) under formation of homopolycarbonates as well as several diphenols of formula (Ia) under formation of copolycarbonates can be used (the meaning of radicals, groups and parameters same as in formula I).

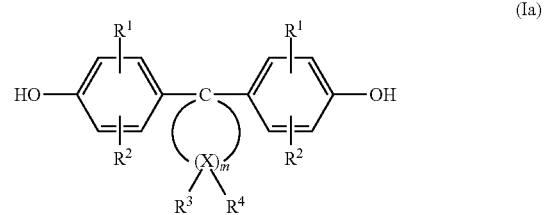

Furthermore, the diphenols of formula (Ia) can also be used in a mixture with other diphenols, for instance with those of formula (Ib)

for making high-molecular, thermoplastic, aromatic polycarbonate derivatives.

Suitable other diphenols of formula (Ib) are those, wherein Z is an aromatic radical with 6 to 30 C atoms, which may contain one or several aromatic nuclei, be substituted and contain aliphatic radicals or other cycloaliphatic radicals than those of formula (Ia) or heteroatoms as bridge members.

Examples for the diphenols of formula (Ib) are: hydroquinone, resorcin, dihydroxydiphenyls, bi-(hydroxyphenyl)- alkenes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, alpha, alpha'-bis-(hydroxyphenyl)-diisopropylbenzenes and their nuclear-alkylated and nuclear-halogenated compounds.

These and other suitable diphenols are e.g. described in the documents U.S. Pat. Nos. 3,028,365, 2,999,835, 3,148,172, 3,275,601, 2,991,273, 3,271,367, 3,062,781, 2,970,131 and 2,999,846, in the documents DE-A 1 570 703, 2 063 050, 2 063 052, 2 211 956, the FR-A 1 561 518 and in the monograph "H. Schnell, *Chemistry and Physics of Polycarbonates*, Interscience Publishers, New York 1964", which with its complete contents is hereby included in the scope of disclosure of the present application.

Preferred other diphenols are for instance: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, alpha, alpha-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, alpha, alpha-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred diphenols of formula (Ib) are for instance: 2,2-bis-(4-hydroxy-phenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propan e and 1,1-bis-(4-hydroxyphenyl)-cyclohexane. In particular, 2,2-bis-(4-hydroxyphenyl)-propane is preferred. The other diphenols may be used individually as well as in a mixture.

The molar ratio of diphenols of formula (Ia) to, if applicable, the also used other diphenols of formula (Ib) should be between 100 mol % (Ia) to 0 mol % (Ib) and 2 mol % (Ia) to 98 mol % (Ib), preferably between 100 mol % (Ia) to 0 mol % (Ib) and 10 mol % (Ia) to 90 mol % (Ib) and in particular between 100 mol % (Ia) to 0 mol % (Ib) and 30 mol % (Ia) to 70 mol % (Ib).

The high-molecular polycarbonate derivatives from the diphenols of formula (Ia), if applicable, in combination with other diphenols, may be made according to the known polycarbonate production methods. The different diphenols may be linked in a statistical manner as well as also block-wise.

The polycarbonate derivatives used according to the invention may be branched in a per se known manner. If the branching is desired, this can be achieved in a per se known manner by condensation of small amounts, preferably amounts between 0.05 and 2.0 mol % (referred to the used diphenols), of three or more than three-functional compounds, in particular such with three or more than three phenolic hydroxyl groups. Some branching agents with three or more than three phenolic hydroxyl groups are: phloroglucin, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-is-(2-hydroxy-5-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-orthoterephthalic acid ester, tetra-(4-hydroxyphenyl)-methane, tetra-[4-(4-hydroxyphenyl-isopropyl)phenoxy]-methane and 1,4-bis-[4',4"-dihydroxytriphenyl)-methyl]benzene. Some of the other three-functional compounds are 2,4-dihydroxy benzoic acid, trim e si c acid, cyanuric chloride and 3,3-bis-(3-methyl-4-hydroxyphenyl)-2-oxo-2,3-dihydroindol.

As chain stoppers for the per se known control of the molecular weight of the polycarbonate derivatives are used monofunctional compounds in usual concentrations. Suitable compounds are e.g. phenol, tert-butylphenols or other alkyl-substituted phenols. For controlling the molecular weight, in particular small amounts of phenols of formula (Ic) are suitable

(Ic)

wherein R is a branched $C_8$ and/or $C_9$ alkyl radical.

Preferably the share of $CH_3$ protons in the alkyl radical R is between 47 and 89% and the share of the CH and $CH_2$ protons is between 53 and 11%; also preferably R is in an o and/or p position to the OH group, and particularly preferably the upper limit of the ortho share is 20%. The chain stoppers are used in general in amounts from 0.5 to 10, preferably from 1.5 to 8 mol %, referred to the used diphenols.

The polycarbonate derivatives may preferably be made according to the phase boundary method (cf. H. Schnell *Chemistry and Physics of Polycarbonates*, Polymer Reviews, Vol. IX, page 33ff., Interscience Publ. 1964) in a per se known manner.

Herein, the diphenols of formula (Ia) are dissolved in an aqueous alkaline phase. For making copolycarbonates with other diphenols, mixtures of diphenols of formula (Ia) and the other diphenols, for instance those of formula (Ib), are used. For controlling the molecular weight, chain stoppers e.g. of formula (Ic) may be added. Then a reaction is performed in presence of an inert, preferably polycarbonate-dissolving, organic phase with phosgene according to the method of the phase boundary condensation. The reaction temperature is between 0° C. and 40° C.

If applicable, branching agents (preferably 0.05 to 2.0 mol %) may either be presented with the diphenols in the aqueous alkaline phase or be added dissolved in the organic solvent before the phosgenation. Beside the diphenols of formula (Ia) and, if applicable, other diphenols (Ib), thus their mono and/or bis-chlorocarbonic acid esters can also be used, the latter being added dissolved in organic solvents. The amount of chain stoppers and of branching agents then depends on the molar amount of diphenolate radicals corresponding to formula (Ia) and, if applicable, formula (Ib); when chlorocarbonic acid esters are also used, the amount of phosgene can correspondingly be reduced in a known manner.

Suitable organic solvents for the chain stoppers and, if applicable, for the branching agents and the chlorocarbonic acid esters are for instance methylene chloride, chlorobenzene and in particular mixtures of methylene chloride and chlorobenzene. If applicable, the used chain stoppers and branching agents can be dissolved in the same solvent.

As an organic phase for the phase boundary polycondensation serve for instance methylene chloride, chlorobenzene and mixtures of methylene chloride and chlorobenzene.

An aqueous alkaline phase serves for instance a NaOH solution. Making the polycarbonate derivatives according to the phase boundary method can by catalyzed in a usual manner by catalyzers such as tertiary amines, in particular tertiary aliphatic amines such as tributylamine or triethylamine; the catalyzers can be used in amounts from 0.05 to 10 mol %, referred to the moles of used diphenols. The catalyzers can be added before the phosgenation or during or also after the phosgenation.

The polycarbonate derivatives can be made according to the prior art method in a homogeneous phase, the so-called "pyridine method" and according to the prior art method for the transesterification of molten mass by using for instance diphenyl carbonate instead of phosgene.

The polycarbonate derivatives may be linear or branched, they are homopolycarbonates or copolycarbonates based on the diphenols of formula (Ia).

By the arbitrary composition with other diphenols, in particular with those of formula (Ib), the polycarbonate properties can be varied in a favorable manner. In such copolycarbonates, the diphenols of formula (Ia) are contained in polycarbonate derivatives in amounts from 100 mol % to 2 mol %, preferably in amounts from 100 mol % to 10 mol % and in particular in amounts from 100 mol % to 30 mol %, referred to the total amount of 100 mol % of diphenol units.

A particularly advantageous embodiment of the invention is characterized by that the polycarbonate derivative comprises a copolymer in particular consisting of monomer units M1 based on formula (Ib), preferably bisphenol A, and monomer units M2 based on the geminally disubstituted dihydroxydiphenyl cycloalkane, preferably of the 4,4'-(3,3,5-trimethyl cyclohexane-1,1-diyl)diphenol, wherein the molar ratio M2/M1 is preferably greater than 0.3, in particular greater than 0.4, for instance greater than 0.5. For such copolymers it has namely been found that surprisingly the glass temperature Tg below 150° C. after a first heating cycle may be increased in a second heating cycle, which can substantially improve the stability of the obtained structure.

Very particularly preferred is a liquid preparation comprising: A) 1 to 30 wt %, preferably 10 to 25 wt %, in particular 15 to 20 wt %, of a polycarbonate derivate used according to the invention, and B) 70 to 99 wt %, preferably 75 to 90 wt %, in particular 80 to 85 wt %, of an organic solvent or of a mixture of solvents.

The used organic solvents are preferably halogen-free organic solvents. These may in particular be aliphatic, cycloaliphatic, aromatic hydrocarbons, such as mesitylene, 1,2,4-trimethylbenzene, cumene and solvent naphtha, toluene, xylene; (organic) esters, such as methylacetate, ethylacetate, butylacetate, methoxypropylacetate, ethyl-3-ethoxypropionate. Preferred are mesitylene, 1,2,4-trimethylbenzene, cumene and solvent naphtha, toluene, xylene, acetic acid methyl ester, acetic acid ethyl ester, methoxypropylacetate, ethyl-3-ethoxypropionate. Particularly preferred are: mesitylene (1,3,5-trimethylbenzene), 1,2,4-trimethylbenzene, cumene (2-phenylpropane), solvent naphtha and ethyl-3-ethoxypropionate.

A suitable mixture of solvents comprises for instance A) 0 to 10 wt %, preferably 1 to 5 wt %, in particular 2 to 3 wt %, of mesitylene, B) 10 to 50 wt %, preferably 25 to 50 wt %, in particular 30 to 40 wt %, of 1-methoxy-2-propanolacetate, C) 0 to 20 wt %, preferably 1 to 20 wt %, in particular 7 to 15 wt %, of 1,2,4-trimethylbenzene, D) 10 to 50 wt %, preferably 25 to 50 wt %, in particular 30 to 40 wt %, of ethyl-3-ethoxypropionate, E) 0 to 10 wt %, preferably 0.01 to 2 wt %, in particular 0.05 to 0.5 wt %, of cumene, and 0 to 80 wt %, preferably 1 to 40 wt %, in particular 15 to 25 wt %, of solvent naphtha, the relative amounts of the components A) to E) always totaling 100 wt %.

Typically the first polycarbonate layer and the second polycarbonate layer have a glass temperature Tg of more than 145° C., in particular more than 147° C.

The invention further relates to a structure, which can be obtained by the method according to the invention. As structural features, such a structure may comprise a first polycarbonate layer, a second polycarbonate layer, an intermediate layer arranged in between the first polycarbonate layer and the second polycarbonate layer and a preparation layer connecting the intermediate layer to the second polycarbonate layer and comprising a polycarbonate derivative based on a geminally disubstituted dihydroxydiphenyl cycloalkane, the polycarbonate layers and the intermediate layer being firmly bonded with each other.

The invention further relates to the use of a method according to the invention for making a security and/or value document, wherein optionally simultaneously with, before or after the production of the structure, the first polycarbonate layer and/or the second polycarbonate layer are directly or indirectly connected with at least one additional layer, for instance a carrier layer. Examples for security and/or value documents are: identity cards, passports, ID cards, access control cards, visas, tax symbols, tickets, driver's licenses, vehicle documents, banknotes, checks, postage stamps, credit cards, any chip cards and adhesive labels (e.g. for product protection). Such security and/or value documents typically comprise at least one substrate, a printing layer and optionally a transparent cover layer. Substrate and cover layer themselves may be composed of a multitude of layers. A substrate is a carrier structure, onto which the printing layer with information, images, patterns and the like is applied. As materials for a substrate, all conventional materials on a paper and/or (organic) polymer basis can be used. Such a security and/or value document comprises within the total multi-layer structure a structure according to the invention. Beside the structure according to the invention, at least one (if applicable, additional) printing layer may be provided, which may be applied between the two polymer layers, on an external surface of the structure or on an additional layer connected with the structure.

In the following, the invention is described in more detail with reference to non-limiting embodiments. There are:

FIG. 1: layer thickness measurements at a layer produced by printing techniques with a preparation used according to the invention, after one-time printing (FIG. 1a) and after two-times printing (FIG. 1b), and FIG. 2: process flow of making a multi-layer structure with a printing layer.

EXAMPLE 1: MAKING POLYCARBONATE DERIVATIVES TO BE USED ACCORDING TO THE INVENTION

Preferred are the polycarbonate derivatives of the Examples 1.3 to 1.5.

EXAMPLE 1.1: MAKING A FIRST POLYCARBONATE DERIVATIVE 205.7 g (0.90 mole) bisphenol A (2,2-bis-(4-hydroxyphenyl)-propane, 30.7 g (0.10 mole) 1,1-bis-(4-hydroxyphenyl)-3,3,5-trimethyl cyclohexane, 336.6 g (6 moles) KOH and 2,700 g water are dissolved in an inert gas atmosphere under stirring. Then a solution of 1.88 g phenol in 2,500 ml methylene chloride is added. Into the well stirred solution, 198 g (2 moles) phosgene are introduced at pH 13 to 14 and 21 to 25° C. Then 1 ml ethylpiperidine is added and stirred for another 45 min. The bisphenolate-free aqueous phase is separated, after acidification with phosphoric acid, the organic phase is washed neutrally with water and freed from solvent.

The polycarbonate derivative had a relative solution viscosity of 1.255. The glass temperature was determined to be 157° C. (DSC).

EXAMPLE 1.2: MAKING A SECOND POLYCARBONATE DERIVATIVE

In an analogous manner to Example 1, a mixture of 181.4 g (0.79 mole) bisphenol A and 63.7 g (0.21 mole) 1,1-bis-(4-hydroxyphenyl)-3,3,5-trimethyl cyclohexane was reacted to the polycarbonate derivative.

The polycarbonate derivative had a relative solution viscosity of 1.263. The glass temperature was determined to be 167° C. (DSC).

EXAMPLE 1.3: MAKING A THIRD POLYCARBONATE DERIVATIVE

In an analogous manner to Example 1, a mixture of 149.0 g (0.65 mole) bisphenol A (2,2-bis-(4-hydroxyphenyl)-propane and 107.9 g (0.35 mole) 1,1-bis-(4-hydroxyphenyl)-3,3,5-trimethyl cyclohexane was reacted to the polycarbonate derivative.

The polycarbonate derivative had a relative solution viscosity of 1.263. The glass temperature was determined to be 183° C. (DSC).

EXAMPLE 1.4: MAKING A FOURTH POLYCARBONATE DERIVATIVE

In an analogous manner to Example 1, a mixture of 91.6 g (0.40 mole) bisphenol A and 185.9 g (0.60 mole) 1,1-bis-(4-hydroxyphenyl)-3,3,5-trimethyl cyclohexane was reacted to the polycarbonate derivative.

The polycarbonate derivative had a relative solution viscosity of 1.251. The glass temperature was determined to be 204° C. (DSC).

EXAMPLE 1.5: MAKING A FIFTH POLYCARBONATE DERIVATIVE

As in Example 1, a mixture of 44.2 g (0.19 mole) bisphenol A and 250.4 g (0.81 mole) 1,1-bis-(4-hydroxyphenyl)-3,3,5-trimethyl cyclohexane was reacted to the polycarbonate.

The polycarbonate derivative had a relative solution viscosity of 1.248. The glass temperature was determined to be 216° C. (DSC).

EXAMPLE 2: MAKING LIQUID PREPARATIONS USED ACCORDING TO THE INVENTION

The following different liquid preparations were made:

A first liquid preparation was made from 17.5 weight parts of the polycarbonate derivative from Example 1.3 and 82.5 weight parts of a solvent mixture according to Table I.

TABLE I

| | |
|---|---|
| Mesitylene | 2.4 |
| 1-methoxy-2-propanolacetate | 34.95 |
| 1,2,4-trimethylbenzene | 10.75 |
| Ethyl-3-ethoxypropionate | 33.35 |
| Cumol | 0.105 |
| Solvent naphtha | 18.45 |

A colorless, highly viscous solution with a solution viscosity of 800 mPas at ambient temperature was obtained.

Further liquid preparations were made according to the following Table II.

TABLE II

| Used substance | wt % | wt % | wt % | wt % | wt % | wt % | wt % |
|---|---|---|---|---|---|---|---|
| Solv. mixture of of Tab. I | 90 | 90 | 90 | 95 | 95 | | |
| Acetone | | | | | | 95 | |
| Butanone | | | | | | | 95 |
| Example 1.3 | 10 | | | | | 5 | 5 |
| Example 1.4 | | 10 | | | | | |
| Example 1.5 | | | 10 | | | | |
| Example 1.2 | | | | 5 | | | |
| Example 1.1 | | | | | 5 | | |

The preparations of the Table II were applied on glass plates for the purpose of deter-mining the softening temperatures, so that dry-layer thicknesses of 5 μm resulted. The layers were dried for 1 hour at 100° C. in the vacuum dry box. Then, the dried films were separated from the glass plate and examined by means of Differential Scanning calorimetry (DSC).

The following thermal conversion temperatures were measured for the films:

| Polymer from | Solvent | $1^{st}$ heating [° C.] | Cooling [° C.] | $2^{nd}$ heating [° C.] | Delta $1^{st}$ heating/ $2^{nd}$ heating |
|---|---|---|---|---|---|
| Example 1.1 | Hydrocarbon mixture | 112.41 | | 113.88 | 1.47 |
| Example 1.2 | Hydrocarbon mixture | 143.02 | 144.29 | 144.28 | 1.26 |
| Example 1.3 | Hydrocarbon mixture | 128.54 | 171.56 | 176.45 | 47.89 |
| Example 1.4 | Hydrocarbon mixture | 172.45 | 188.22 | 191.68 | 19.23 |
| Example 1.5 | Hydrocarbon mixture | 170.39 | 207.20 | 207.06 | 36.67 |
| Example 1.3 | Acetone | 165.80 | 155.40 | 157.22 | −8.58 |
| Example 1.3 | Butanon | 174.21 | 172.20 | 179.11 | 4.9 |

It is remarkable that for instance the film of Example 1.3 has after drying after the $1^{st}$ heating-up step a softening temperature of 128.54° C. Only after the cooling-off and $2^{nd}$ heating-up steps, the expected transitions at 171.56 or 176.45° C., respectively are observed.

Due to the fair solubility for instance of the polycarbonate derivate of Example 1.3 in halogen-free solvents and the detected softening behavior of dried films, this material is excellently suitable to serve as a bonding agent in polycarbonate-based structure materials, in particular so-called smart cards.

EXAMPLE 3: MAKING STRUCTURES ACCORDING TO THE INVENTION

A polycarbonate film 1 Makrofol® 6-2 (thickness approx. 100 μm) is covered with an intermediate layer 3, in the example a printing layer 3 (FIG. 2a), for instance by means of offset or silk-screen printing. On the left side, a printing layer with a screened print can be seen, whereas on the right side a printing layer 3 of a print over the full surface is shown. The printing layer 3 is first dried, if applicable. Then the side of the polycarbonate film 1 provided with the printing layer 3 is fitted for instance by silk-screen printing with a preparation layer 4 of a composition of Example 2, for instance based on the polycarbonate derivate according to Example 1.3 and the mixture of solvents according to Table I (FIG. 2b). This can take place either over the full surface, or, as shown, partially only, covering the regions of the printing layer 3. Silk-screen printing is made once or twice. Then drying is made under air atmosphere at 100° C. for 60 min. A layer thickness of approx. 2.2 µm or 3.3 µm of the dried polycarbonate derivate (FIG. 2b) results. Then the side of the polycarbonate film 1 with the printing layer 3 and the preparation layer 4 is covered with another polycarbonate film 2 Makrofol® 6-2 (thickness approx. 100 µm), and the thus resulting structure is laminated with, if applicable, further stacked polymer layers 5, 6, 7 in a conventional industrial laminating press under the action of usual pressures (approx. 5 bars) and at about 160° C. (FIGS. 2c and 2d).

An optical investigation of the structure did not show any recognizable phase limit. The structure is a monolithic block.

Comparative experiments were made in a corresponding manner, however without the preparation layer 4. Then it was found that a structure according to the invention is clearly more stable against delamination between the printing layer 3 and the second polymer layer 2 than in said comparative experiments representing prior art.

The invention claimed is:

1. A method for making a structure with at least one first polymer layer (1) and a second polymer layer (2), each said layer is made from a polycarbonate polymer based on bisphenol A, and in between the first polymer layer (1) and the second polymer layer (2) is an intermediate layer (3) being arranged, comprising the following steps:
   a) applying the intermediate layer (3) at least on a partial region of the first polymer layer (1),
   b) optionally, drying the intermediate layer (3),
   c) coating the first polymer layer (1) on the side, on which the intermediate layer (3) is arranged, with a liquid preparation comprising a solvent or a mixture of solvents and a polycarbonate derivative based on a geminally disubstituted dihydroxydiphenyl cycloalkane, the preparation covers the intermediate layer (3),
   d) optionally, drying after step c),
   e) after step c) or step d), placing the second polymer layer (2) on the first polymer layer (1) covering the intermediate layer (2), and
   f) laminating the first polymer layer (1) and the second polymer layer (2) with each other under pressure, at a temperature from 120° C. to 230° C. and for a defined time, the intermediate layer being a layer that is configured to cause a reduced adherence of the first polymer layer to the second polymer layer relative to adherence of the first and second layer without use of the intermediate layer therebetween.

2. The method according to claim 1, wherein the intermediate layer (3) is a printing layer comprising a security printing element and/or a printed photographic representation, a photographic emulsion, and/or a film, in particular a diffractive security film.

3. The method according to claim 1, wherein the polycarbonate derivative has an average molecular weight (mean weight) of at least 10,000.

4. The method according to claim 1, wherein the polycarbonate derivative comprises functional carbonate structure units of formula (I),

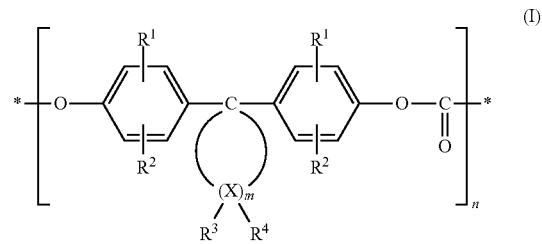

wherein
$R^1$ and $R^2$ are independently from each other hydrogen, halogen, $C_1$-$C_8$ alkyl, $C_5$-$C_6$ cycloalkyl, $C_6$-$C_{10}$ aryl, and $C_7$-$C_{12}$ aralkyl,
m is an integer from 4 to 7,
$R^3$ and $R^4$ can be individually selected for each X, and independently represent hydrogen or $C_1$-$C_6$ alkyl
X is carbon and
n is an integer greater than 20,
with the proviso that at least one atom X, $R^3$ and $R^4$ are both alkyl.

5. The method according to claim 4, wherein at 1 to 2 atoms X, $R^3$ and $R^4$ are both alkyl.

6. The method according to claim 4, wherein $R^3$ and $R^4$ are methyl.

7. The method according to claim 4, wherein the X atoms in the alpha position to the diphenyl-substituted C atom (C1) are not dialkyl-substituted.

8. The method according to claim 4, wherein the X atoms in the beta position to C1 are disubstituted with alkyl.

9. The method according to claim 4, wherein m is 4 or 5.

10. The method according to claim 4, wherein the polycarbonate derivative is based on
4,4'-(3,3,5-trimethyl cyclohexane-1,1-diyl) diphenol,
4,4'-(3,3-dimethyl cyclohexane-1,1-diyl) diphenol, or
4,4'-(2,4,4-trimethyl cyclopentane-1,1-diyl) diphenol.

11. The method according to claim 1, wherein the polycarbonate derivative comprises a copolymer consisting of monomer units M1 based on the formula HO—Z—OH, where Z is an aromatic radical with 6 to 30 atoms, and monomer units M2 based on the geminally disubstituted dihydroxydiphenyl cycloalkane, preferably of the 4,4'-(3,3, 5-trimethyl cyclohexane-1,1-diyl) diphenol, wherein the molar ratio M2/M1 is greater than 0.3.

12. The method according to claim 1, wherein the temperature in step f) is in the range from 140° C. to 200° C.

13. The method according to claim 1, wherein the first polycarbonate layer (1) and the second polycarbonate layer (2) have a glass temperature Tg of more than 145° C.

14. The method according to claim 1, wherein the thickness of the first polycarbonate layer (1) and of the second polycarbonate layer (2) differ by no more than 1,000 µm.

15. The method according to claim 1, wherein the thickness, measured in directions orthogonal to a main face of a polycarbonate layer (1, 2), of the intermediate layer (3) is in the range from 0.1 to 1,000 µm.

16. The method according to claim 1 wherein the structure is a security and/or value document, and further comprising directly or indirectly connecting at least one additional layer with the first polycarbonate layer (1) and/or the second polycarbonate layer (2).

\* \* \* \* \*